Jan. 11, 1938.  J. W. FITZ GERALD  2,105,350
DEVICE FOR PREVENTING UNINTENTIONAL LOCKING OF AUTOMOBILE DOORS
Filed June 7, 1935  2 Sheets-Sheet 1

Inventor
John W. FitzGerald

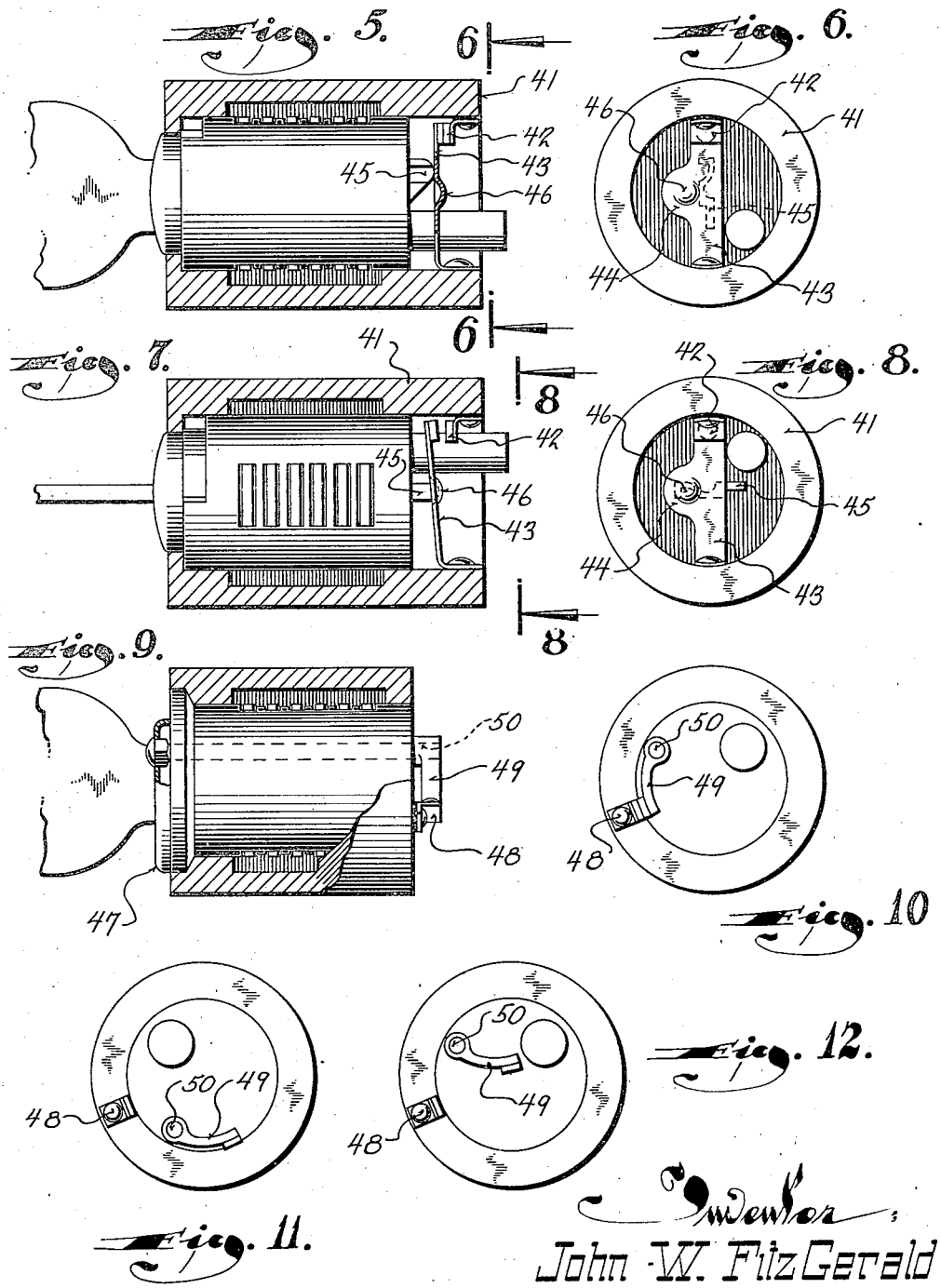

Patented Jan. 11, 1938

2,105,350

UNITED STATES PATENT OFFICE 2,105,350

DEVICE FOR PREVENTING UNINTENTIONAL LOCKING OF AUTOMOBILE DOORS

John W. Fitz Gerald, Milwaukee, Wis., assignor to Briggs & Stratton Corporation, Milwaukee, Wis., a corporation of Delaware Application June 7, 1935, Serial No. 25,447

19 Claims. (Cl. 70—441)

This invention relates to locking means for automobile doors.

It is an object of this invention to prevent the possibility of a driver of an automobile locking himself out.

In the modern automobile all of the doors can be locked from the inside by a safety latching device so that when a person steps out of the car and closes the door, the door automatically locks. One of the doors may be opened from the outside by means of a proper key, which is also used for the ignition lock. Consequently, if the driver neglects to remove the key from the ignition lock before stepping out of the car, and closes the door behind him, he has locked himself out.

The present invention has as its purpose to preclude this possibility through the provision of an interlock between the ignition lock and the door lock.

More specifically it is an object of this invention to provide means operable upon the door latching mechanism to prevent the locking thereof and a control therefor incorporating the key controlled lock cylinder of the ignition lock.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 5 is a section view through an ignition lock illustrating another manner in which the same may be used to control the latching mechanism of the door;

Figure 6 is an end view of the structure shown in Figure 5 taken on the plane of the line 6—6;

Figure 7 is a view similar to Figure 5 and showing the parts in another position;

Figure 8 is an end view of the lock shown in Figure 7 and taken on the plane of the line 8—8;

Figure 9 illustrates another modified embodiment of the invention;

Figure 10 is an end view of the structure shown in Figure 9 with the parts in the position shown in Figure 9; and Figures 11 and 12 are end views similar to Figure 10, but with the parts in different position.

Figure 1:
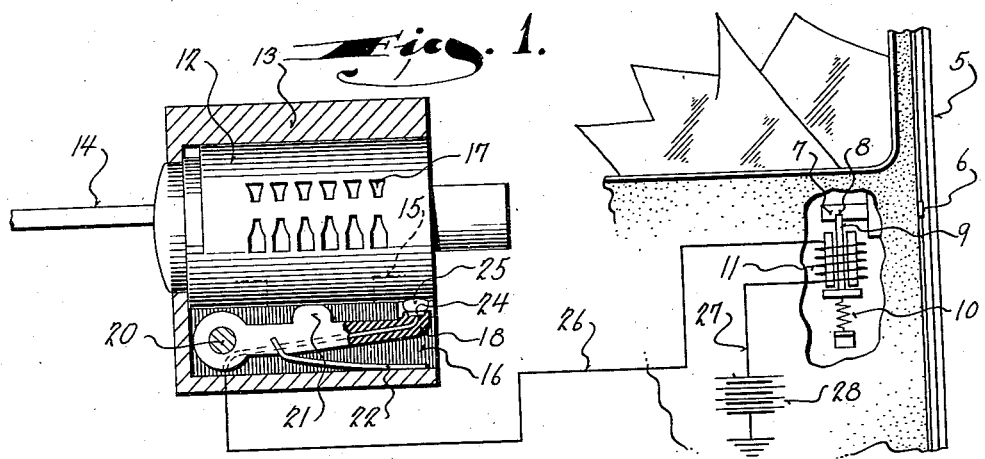
Figure 1 is a view showing part of an ignition lock in section and part of the door latching mechanism with one embodiment of the invention applied thereto.

Referring now more particularly to the accompanying drawings in which like numerals indicate like parts throughout the several views, the numeral 5 designates a door of an automobile. As is customary the door is provided with a bolt 6 projectable into a keeper recess (not shown) to hold the same closed. The bolt is securable in its projected position by lock means (not shown) operable from the outside only through the use of a proper key.

For the purposes of this invention, the bolt 6 may be provided with an extension 7 having a notch or recess 8 into which a retaining finger 9 is projectable to hold the bolt in a retracted position and prevent its projection to operative door holding position. The finger 9 is normally disengaged from the notch or recess 8 by a spring 10 and is projectable to its operative position engageable in the recess or notch 8 by an electromagnet 11.

With the door closed and the bolt projected to its door closing position, the notch or recess 8 is out of line with the finger 9 so that in the event the electromagnet is energized with the parts in this position, its end which is to engage in the notch or recess 8 merely abuts the surface of the bolt at one side of the notch. If the electromagnet then remains energized holding the finger 9 against the bolt, upon retraction of the bolt to open the door, the finger 9 snaps into the notch and thus prevents projection of the bolt to its door closing position until the electromagnet is deenergized. Consequently, by controlling the energization of the electromagnet 11, it is possible to prevent locking the door.

Different schemes may be employed to control the energization of the electromagnet, but inasmuch as the key used to open the door lock also is the key for the ignition lock, it is preferable to use the ignition lock as the controlling medium for the energization of the electromagnet 11.

In Figure 1 one manner of using the ignition lock to control the energization of the electromagnet is illustrated. The actual ignition switch forms no part of this invention and is therefore now shown, but as is well known, the switch is controlled by a conventional lock cylinder 12 rotatable in a mounting member or casing 13 upon insertion of a proper key 14 into the cylinder.

In the embodiment illustrated in Figure 1, the lock cylinder is of that type wherein the key controlled tumblers do not project from the cylinder, but act through a locking bar 15 projectable from the side of the cylinder in a plane substantially normal to the plane of tumbler movement. When the locking bar 15 is projected from the cylinder, it enters a groove 16 in the casing or mounting member and thus secures the cylinder against rotation. Upon insertion of the key 14, and the consequent retraction of the tumblers 17, the locking bar 15 is retracted within the periphery of the cylinder thus freeing the cylinder for rotation.

The projection of the locking bar 15 to its operative locked position is utilized to actuate a lever 18. The lever 18 is pivoted as at 20 within the groove 16 and has a medially located projection 21 engageable with the locking bar 15. A spring 22 yieldingly urges the lever toward the cylinder.

A contact 24 carried by the outer free end of the contactor arm is engageable with a contact 25 mounted on the cylinder when the locking bar is retracted, as shown in Figure 1. The lock cylinder is of course grounded, hence, by connecting the contact 24 through a conductor 26 with one side of the electromagnet and connecting the other side of the electromagnet through a conductor 27 to the ungrounded side of the battery 28, as shown, it follows that whenever the contacts 24 and 25 are engaged, the circuit of the electromagnet is complete.

The engagement of the contacts 24 and 25 is dependent upon the presence of a key 14 in the lock cylinder 12 and also upon the position of rotation of the cylinder. With the cylinder in its locked position of rotation, the insertion of the key 14, through the retraction of the locking bar effected thereby, permits the engagement of the contacts 24 and 25 to close the circuit of the electromagnet. However, when the cylinder is turned out of locked position, the contact 25 is carried out of alignment with the contact 24, and inasmuch as the projection 21 resting on the surface of the cylinder prevents engagement of the contact 24 with the cylinder the circuit of the electromagnet is open.

Hence it follows that whenever the ignition lock has been actuated to close the ignition circuit, the electromagnet is deenergized, but as soon as the ignition lock is turned back to its locked position to open the ignition circuit, the electromagnet is energized and remains energized until the key 14 is withdrawn.

Figures 2, 3:
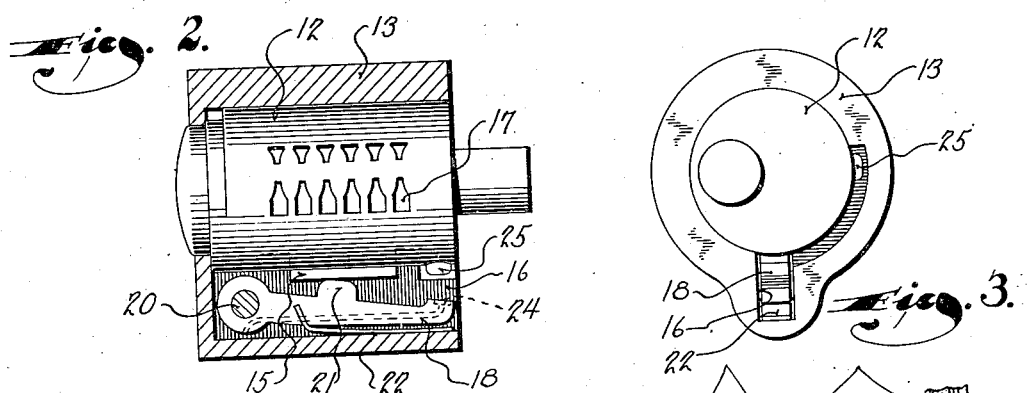
Figure 2 is a section view of the ignition lock shown in a position other than that shown in Figure 1.
Figure 3 is an end view of the ignition lock.
Figure 4:
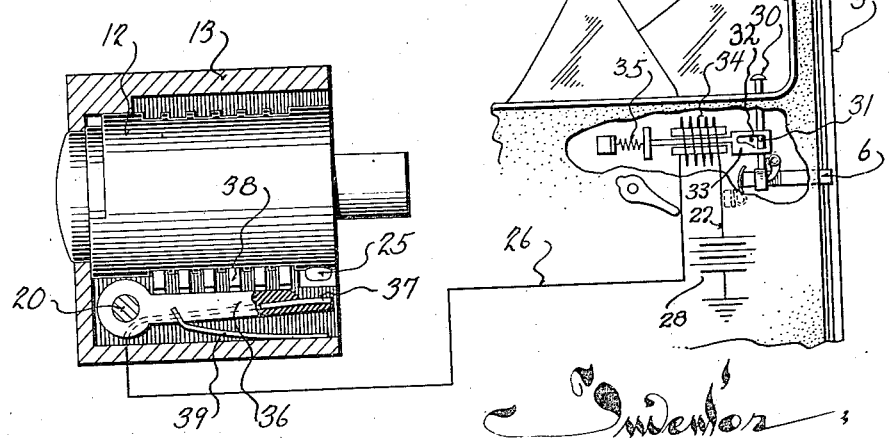
Figure 4 is a view similar to Figure 1 illustrating a modified embodiment of the invention.

The embodiment of the invention illustrated in Figure 4 is slightly different from that shown in Figures 1, 2, and 3. In this modification the automobile latching mechanism is of the type wherein the driving connection between the handle on the outside of the door and the latching mechanism is disrupted by the depression of a button 30 on the inside of the door. The instrumentalities through which the depression of the button disrupts the connection between the outside handle and the door latching mechanism has not been shown as it forms no part of this invention.

For the purposes of this invention, the stem of the button 30 is provided with a cross pin 31 which is received in a substantially triangular shaped opening 32 in a slide 33. The slide 33 moves horizontally or in a plane normal to the direction of motion of the button 30. As long as the widest end of the triangular opening 32 is in line with the cross pin 31, it is possible to depress the button 30, but when the small restricted end of the triangular opening is moved into engagement with the cross pin 31, the button 30 is held against being depressed so that the operative connection between the outside door handle and the door latching mechanism cannot be broken.

The position of the slide 33 is controlled by an electromagnet 34 and a spring 35. The spring 35 yieldingly urges the slide to its inoperative position maintaining the wide end of its opening 32 in line with the cross pin 31, while the electromagnet upon energization moves the slide in the opposite direction to engage the restricted end of the opening 32 with the pin 31.

As before, the energization of the electromagnet 34 is controlled by the ignition lock. The actual embodiment of the ignition lock in this instance is also slightly different from that shown in Figure 1.

In this modification the lever 36 carrying the contact 37 is acted upon directly by the tumblers 38 of the lock cylinder. When the key is not present in the cylinder, the tumblers 38 project from its periphery and hold the lever 36 in its inoperative position against the action of its spring 39. In this position, the contact 37 is disengaged from the contact 25. Obviously, upon insertion of a key the contact 37 engages the contact 25 to close the circuit of the electromagnet and energize the same, and as before, turning the cylinder moves the contact 25 out of line with the contact 37, and inasmuch as the contact 37 cannot touch the cylinder by reason of the shape of the lever 36, closure of the electromagnet circuit is prevented as long as the lock cylinder is in any but its locked position of rotation.

In Figures 5 to 8, inclusive, another modified manner of closing the circuit for the electromagnet is shown. In this embodiment of this invention, the casing 41 of the lock cylinder has an insulated stationary contact 42 which is connectible with the electromagnet, and a movable contactor 43 mounted on the casing, and grounded therethrough.

The contactor has a portion 44 opposite the inner end of the keyway in the cylinder from which the nose 45 of the key projects. With the lock cylinder in its locked position of rotation, as shown in Figures 5 and 6, the nose of the key engages the contactor arm 43 so that the switch afforded by the contactor 43 and the contact 42 is closed, but upon rotation of the cylinder, the nose of the key swings in an arc and aligns with a depression or cup 46 formed in the contactor arm which permits the arm to spring away from the contact 42 by its inherent resiliency, thus opening the switch and deenergizing the electromagnet controlled thereby.

In Figures 9 to 12, inclusive, the switch for controlling the energization of the electromagnet is opened and closed by the movement of a dust cover 47 to and from its operative position closing the outer end of the keyway in the usual manner.

In this instance, the switch comprises a stationary contact 48 mounted on but insulated from the casing of the ignition lock, and a movable contactor 49. The movable contactor is fixed to a shaft 50 which extends through the cylinder 12 to have its forward end non-rotatably secured to the dust cover 47. The shaft 50 also mounts the dust cover so that the cover swings about the axis of the shaft. The disposition of the parts is such that when the cover is swung to its open position to permit insertion of the key, the contactor 49 is engaged with the contact 48, as best shown in Figure 10. This is the locked position of the cylinder.

When the cylinder is turned out of its locked position, as shown in Figure 11, the contactor 49 though held in its operative position by the dust cover is carried out of engagement with the contact 48, and when the key is withdrawn the contactor 49 is entirely disengaged from the contact 48, as shown in Figure 12.

From the foregoing description taken in connection with the accompanying drawings, it will be readily apparent to those skilled in the art to which this invention appertains, that this invention provides novel and simple means for precluding the possibility of having all the doors of an automobile locked unless precaution has been taken to remove the key from the ignition lock.

What I claim as my invention is:

1. In combination with an automobile door and a key controlled ignition lock for the automobile, means adapted to be rendered operative to prevent locking the door, and a control for said means regulated by the presence or absence of a key in the ignition lock.

2. In combination with an automobile door and an ignition lock for the automobile, means for preventing securing the door in closed position, electromagnetic means for rendering said first named means operative, and a circuit controlled by the presence or absence of a key in the ignition lock for energizing said electromagnetic means.

3. In combination with an automobile door and an ignition lock for the automobile, means for preventing locking of the door, electrically operable means for rendering said first named means operative, a circuit for energizing said electrically operable means, and a switch in said circuit controlled by the presence or absence of a key in the ignition lock.

4. In combination with an automobile door and a key controlled ignition lock for the automobile, means for preventing locking of the door, electrical means for rendering said first named means operative, and a control for said last named means including a switch regulated by the presence of a key in the ignition lock.

5. In combination with an automobile door and a key controlled ignition lock for the automobile, means for preventing locking of the door, electrical means for rendering said first named means operative, and a control for said last named means directly associated with said key controlled ignition lock and having a switch regulated by the presence of a key in the lock and the position of the lock so that when the lock is in one position with a key therein the means for preventing locking of the door is operative.

6. In combination with an automobile door and a key controlled ignition lock for the automobile, means for preventing locking of the door, electrically operable means for rendering said first named means operative, and a switch for controlling said electrically operable means, the switch being directly associated with the ignition lock to be closed only when a key is present in the ignition lock and the lock is in a predetermined position.

7. In combination with an automobile door and a key controlled ignition lock including a lock cylinder and a part movable in a predetermined manner upon insertion of a key into the cylinder, means to prevent locking of the door, electrically operable means for rendering said first named means operative, and a switch to control said electrically operable means, said switch being regulated by the part movable upon insertion of a key into the lock cylinder.

8. In combination with an automobile door and a key controlled ignition lock for the automobile including a rotatable lock cylinder adapted to have a key inserted therein, means for preventing locking of the door, electrically operable means for rendering said first named means operative, and a switch for controlling said electrically operable means directly associated with the ignition lock and adapted to be closed in response to the insertion of a key into the lock cylinder while the lock cylinder is in its locked position of rotation.

9. In combination with an automobile door and a key controlled ignition lock for the automobile including a rotatable lock cylinder adapted to have a key inserted therein, means for preventing locking of the door, electrically operable means for rendering said first named means operative, and a switch for controlling said electrically operable means directly associated with the ignition lock and adapted to be closed in response to the insertion of a key into the lock cylinder while the lock cylinder is in its locked position of rotation, said switch being opened upon rotation of the cylinder away from its locked position.

10. In combination with an automobile door and a key controlled ignition lock for the automobile including a lock cylinder having a keyway to receive a key and having a part projectable from the periphery of the cylinder to effect a locking function and retractible within the periphery of the cylinder upon the insertion of a key, means for preventing locking of the door, electrically operable means for rendering said first named means operative, and a switch for said electrically operable means comprising a pivoted lever having a portion engageable with said part projectable from the lock cylinder to move toward the cylinder in response to the insertion of a key and consequent retraction of said part, a contact carried by the lever, and a contact carried by the cylinder and engageable by the first named contact in response to movement of the lever toward the cylinder upon the insertion of the key.

11. In combination with an automobile door and a key controlled ignition lock for the automobile including a lock cylinder having a keyway to receive a key and having a part projectable from the periphery of the cylinder to effect a locking function and retractible within the periphery of the cylinder upon the insertion of a key, means for preventing locking of the door, electrically operable means for rendering said first named means operative, and a switch for said electrically operable means comprising a pivoted lever having a portion engageable with said part projectable from the lock cylinder to move toward the cylinder in response to the insertion of a key and consequent retraction of said part, a contact carried by the lever, and a contact carried by the cylinder and engageable by the first named contact in response to movement of the lever toward the cylinder upon the insertion of the key, said cylinder carried contact moving out of engagement with the lever carried contact to open the switch upon rotation of the cylinder.

12. In combination with an automobile door, a member having a predetermined motion necessary to effect locking of the door, a second member movable into an interlocking position with the first member to prevent such motion, electrically operable means for moving said second member into operative relationship with the first member, and a switch for controlling the functioning of said electrically operable means, said switch being operable as an incident to the performance of a function in the operation of the automobile so that the switch is closed and the means for preventing locking of the door is operative until the performance of said function so that the performance of said function prior to the locking of the door is assured.

13. In combination with an automobile door and a key controlled ignition lock for the automobile, a member having a predetermined motion necessary for locking the door, electromagnetic means for preventing said motion of said member, and switch means opened and closed by the mere insertion and withdrawal of a key into and from the ignition lock for regulating the energization of said electromagnetic means.

14. In combination with an automobile door, a manually operable member having a predetermined motion necessary to effect locking of the door, a second member movable into interlocking relationship with the first designated member to prevent such motion of the first designated member, and electromagnetic means for moving said second designated member to its operative position.

15. In combination with an automobile having a key controlled ignition lock and a door provided with a latch and a door handle operatively associated therewith, and a member movable to disrupt the operating connection between the door handle and the latch so that upon operation of said member the latch is rendered inoperable by the handle so that the door will be automatically locked upon closure, a member movable into interlocking relationship with said first designated member to prevent said motion of the first designated member and thereby prevent locking of the door, electrically operable means to effect movement of said second designated member into interlocking relationship with the first designated member, and a switch opened and closed by insertion and removal of a key into and from the ignition lock for controlling said electrically operable means.

16. In combination with a door of an automobile and a key controlled ignition lock for the automobile, means for preventing locking the door closed, and means controlled by the presence of the key in the ignition lock for rendering said first named means operative.

17. In combination with an automobile door having a latch for retaining the same closed and a key controlled ignition lock for the automobile, means to prevent the latch from retaining the door in closed position, and means controlled by the presence of a key in the ignition lock for rendering said first named means operable.

18. In combination with an automobile door and a key controlled ignition lock for the automobile, normally inoperative means adapted to be rendered operative for preventing the securing of the door in closed position, and means controlled by the presence of a key in the ignition lock for rendering said first named means operative, said second named means being effective when the key is in the ignition lock and being ineffective only when the key is withdrawn from the ignition lock whereby inability to secure the door in closed position is an indication that the ignition key has not been withdrawn.

19. In combination with a door of an automobile and a key controlled ignition lock for the automobile, means operable upon opening of the ignition switch to prevent securing the door in closed position, said means being rendered inoperative to allow securing the door in closed position only by withdrawal of the key from the ignition lock whereby inability to secure the door closed is an indication that the ignition switch has been turned off but that the ignition key is still in the ignition lock.

JOHN W. FITZ GERALD.